United States Patent [19]

Hokamura

[11] Patent Number: 5,684,524

[45] Date of Patent: Nov. 4, 1997

[54] WRITE START POSITION DETECTING DEVICE FOR LIGHT BEAM SCANNING DEVICE

[75] Inventor: Satoshi Hokamura, Tokyo, Japan

[73] Assignee: Asahi Kogaku Kogyo Kabushiki Kaisha, Tokyo, Japan

[21] Appl. No.: 362,886

[22] Filed: Dec. 23, 1994

[30] Foreign Application Priority Data

Dec. 24, 1993 [JP] Japan .................. 5-073963 U

[51] Int. Cl.$^6$ .................. B41J 2/47; G01D 15/34; G02B 26/00; G02B 27/00

[52] U.S. Cl. .................. 347/259

[58] Field of Search .................. 347/134, 138, 347/250, 253, 256

[56] References Cited

U.S. PATENT DOCUMENTS

| | | | |
|---|---|---|---|
| 4,918,306 | 4/1990 | Saito | 250/235 |
| 5,010,353 | 4/1991 | Murahashi et al. | 347/250 |
| 5,084,616 | 1/1992 | Morimoto | 250/235 |
| 5,194,994 | 3/1993 | Takizawa et al. | 359/871 |
| 5,206,754 | 4/1993 | Yano et al. | 347/134 |
| 5,216,248 | 6/1993 | Ikeda et al. | 250/237 R |
| 5,247,386 | 9/1993 | Saito | 359/216 |
| 5,365,364 | 11/1994 | Taylor | 347/256 |

*Primary Examiner*—Benjamin R. Fuller
*Assistant Examiner*—L. Anderson
*Attorney, Agent, or Firm*—Greenblum & Bernstein, P.L.C.

[57] ABSTRACT

A write start position detecting device has a curved mirror positioned in a plane in which a light beam is scanned to form a latent image on a photosensitive drum. The curved mirror is located at a position where a light beam reflected from it illuminates a photoreceptor element prior to the light source starting the writing operation. The photoreceptor element is located at a position, with respect to the curved mirror, ahead of the scanning direction in which the light beam strikes the photosensitive member to form the latent image thereon.

21 Claims, 2 Drawing Sheets

WRITE START POSITION DETECTING DEVICE FOR LIGHT BEAM SCANNING DEVICE

BACKGROUND OF THE INVENTION

1. Field of the Invention

The present invention relates to a light beam scanning device which is provided in a laser printer to scan a light beam onto a photosensitive drum to form a latent image, and especially to a write start position adjusting device by which a position where the light beam starts to form a latent image on a photosensitive drum is detected.

2. Description of the Related Art

In a conventional laser printer, a light beam emitted from a light source is deflected by a reflecting surface of a polygon mirror rotating at a constant speed, thereby scanning the light beam in a predetermined direction. Thereafter, it is directed onto a photosensitive drum to form a latent image thereon.

Prior to the start of a form operation, the light beam is reflected by a light beam reflecting mirror and is directed into a photoreceptor element. When the amount of light detected by the photoreceptor element exceeds a predetermined value, a horizontal synchronizing signal is outputted by a light beam sensing circuit, and inputted to a control unit for the light source, starting the form operation.

If it is desired to achieve, for example, miniaturization of the light beam scanning device, the photoreceptor element and the light beam sensing circuit would have to be positioned close to the light beam reflecting mirror. However, the photoreceptor element and the light beam sensing circuit would then easily interfere in the area where the light beam scans to form the latent image on the photosensitive drum.

Therefore, the positions where the photoreceptor element and the light beam sensing circuit can be attached are restricted and cannot be freely adjusted, and miniaturization of the light beam scanning device is limited.

SUMMARY OF THE INVENTION

The object of the present invention is to provide a write start position detecting device in which the degree of freedom in arranging optical components such as the photoreceptor element can be increased, and miniaturization of the light beam scanning device is easily achieved.

According to the present invention, there is provided a write start position detecting device provided in a light beam scanning device which scans a light beam in a main scanning direction, emitted from a light source, to form a latent image on a photosensitive member. The device includes a photoreceptor element detecting the emitted light beam and an optical component reflecting and converging the emitted light beam on the photoreceptor element. The optical component is located at such a position that the light beam reflected therefrom illuminates the photoreceptor element prior to the light source starting to form a latent image on the photosensitive member.

Optionally, the optical component is a mirror having a curved reflecting surface.

Still further optionally, the optical component is a prism having a curved exterior transmissive surface.

Further according to the present invention, there is provided a write start position detecting device provided in a light beam scanning device which scans a light beam in a main scanning direction. The beam is emitted from a light source, to form a latent image on a photosensitive member, the device includes an optical component located ahead of a position where the emitted light beam starts to scan the photosensitive member, and a photoreceptor element detecting the emitted light beam focused by the optical component. The photoreceptor element is located at a position opposite to the optical component with respect to an area in which the emitted light beam scans to strike the photosensitive member.

BRIEF DESCRIPTION OF THE DRAWINGS

The present invention will be better understood from the description of the preferred embodiments of the invention, as set forth below, together with the accompanying drawings in which.

DESCRIPTION OF THE PREFERRED EMBODIMENTS

Figure 1:
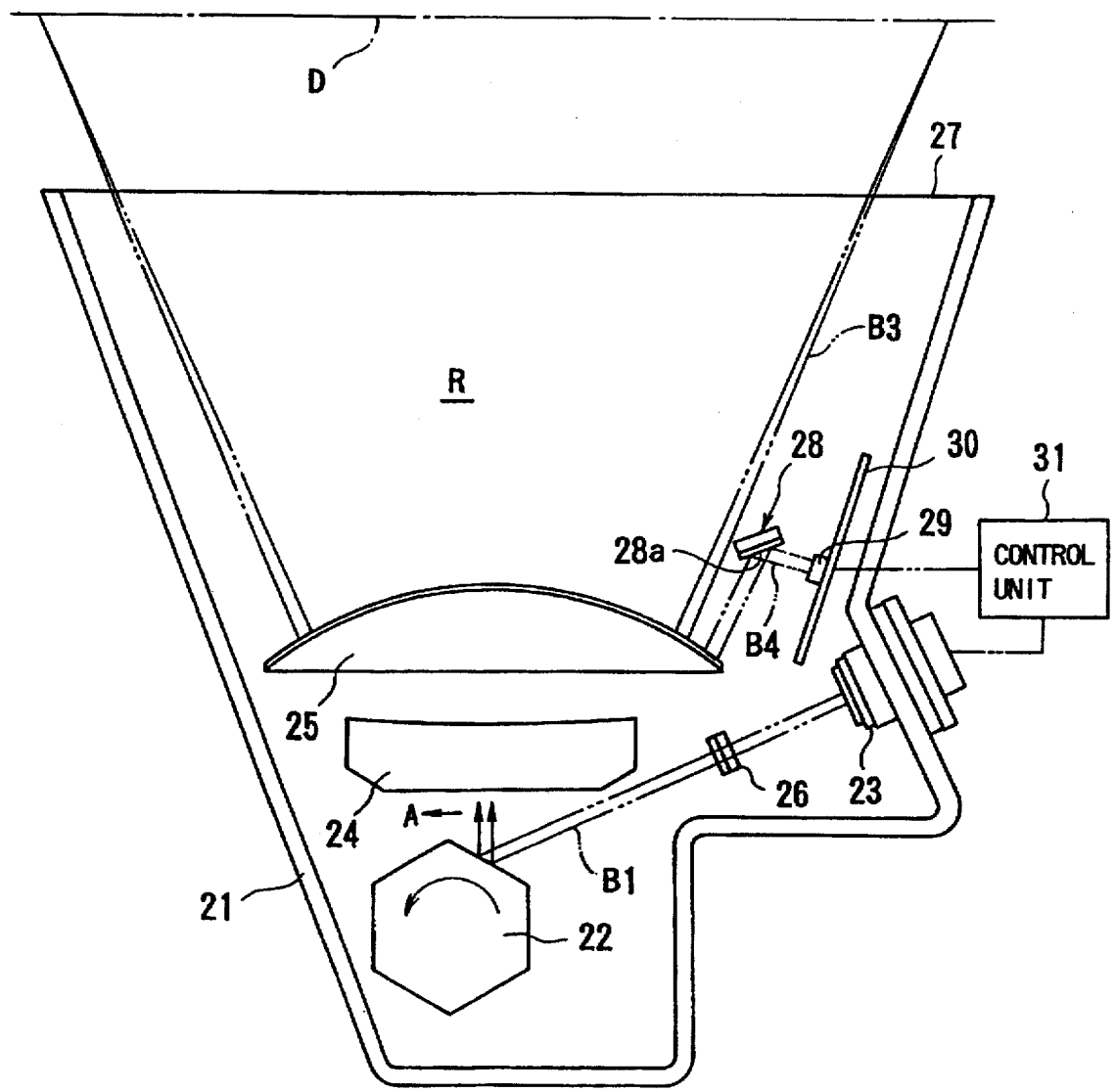
FIG. 1 is a plan view showing the structure of a light beam scanning device provided with a write start position detecting device of an embodiment of the present invention.

The present invention will now be described with reference to embodiments shown in the drawings.

FIG. 1 is a plan view showing a structure of a light beam scanning device provided with a write start position detecting device of an embodiment of the present invention.

A polygon mirror 22, driven by a motor (not shown), is provided in a housing 21, and rotates counterclockwise at a constant speed. A light source (laser diode) 23 for generating a light beam is attached on a wall of the housing 21. A correcting cylinder lens 26 is provided, between the light source 23 and the polygon mirror 22, to correct optical characteristics such as astigmatism which occur due to manufacturing errors in fΘ lenses 24 and 25. A light beam B1 generated by the light source 23 passes through the correcting cylinder lens 26 and is incident onto one of the reflecting surfaces of the polygon mirror 22.

The fΘ lenses 24 and 25 are located inside of an outlet opening 27 in the housing 21, between the outlet opening 27 and the polygon mirror 22. The light beam B1 is deflected by the rotating polygon mirror 22, causing it, thereafter indicated as light beam B3, to be scanned in the main scanning direction shown by the arrow A. The scanning speed is corrected to a constant value by passing through the fΘ lenses 24 and 25. The light beam B3 emerges from the fΘ lenses 24 and 25, passes through the outlet opening 27 and strikes a photosensitive drum D.

The photosensitive drum D rotates about its longitudinal axis in an auxiliary scanning direction perpendicular to the main scanning direction. The light beam B3 is a pulsed laser light alternating on and off which strikes the photosensitive drum D forming a series of points. Due to the rotation of photosensitive drum D, the locus of these points together form a series of latent images which may be printed onto a suitable surface through methods well known in the art.

A curved mirror 28 is located between the outlet opening 27 and the fΘ lens 25, just before a write start position where the light beam B3 starts to form a latent image on the photosensitive drum D. The curved mirror 28 has light converging power in the auxiliary scanning direction.

A reflecting surface 28a of the curved mirror 28 faces a direction substantially towards the light source 23. The reflecting surface 28a reflects light beam B3, thereafter referred to as light beam B4. A photoreceptor element 29 is provided between the curved mirror 28 and the light source 23, opposite the curved mirror 28 with respect to the area R where the light beam B3 is scanned. Namely, the photoreceptor element 29 is located in such a position, with respect to the curved mirror 28, that it detects the presence of light beam B4 before light beam B3 starts to form a latent image on the photosensitive drum D. The photoreceptor element 29 detects light beam B4 and upon detection, sends a signal to the beam sensing circuit board 30. The curved mirror 28 reflects and converges light beam B4 in the auxiliary scanning direction, illuminating photoreceptor element 29 with sufficient optical energy, compensating for possible tilt errors in some of the reflecting surfaces of the rotating polygon mirror 22.

A light beam sensing circuit board 30 is connected to the photoreceptor element 29. The light beam sensing circuit board 30 outputs a horizontal synchronizing signal to the control unit 31 when the photoreceptor element 29 detects light beam B4. Upon receipt of this horizontal synchronizing signal, the control unit 31 counts a predetermined period of time, and then actuates the light source 23 so that it starts emitting a pulsed laser light beam. The curved mirror 28 is located at such a position that the light beam B4, reflected from it, illuminates photoreceptor element 29, hence initiating the predetermined count period, prior to light source 23 starting to form a latent image on the photosensitive drum D.

Figure 2:
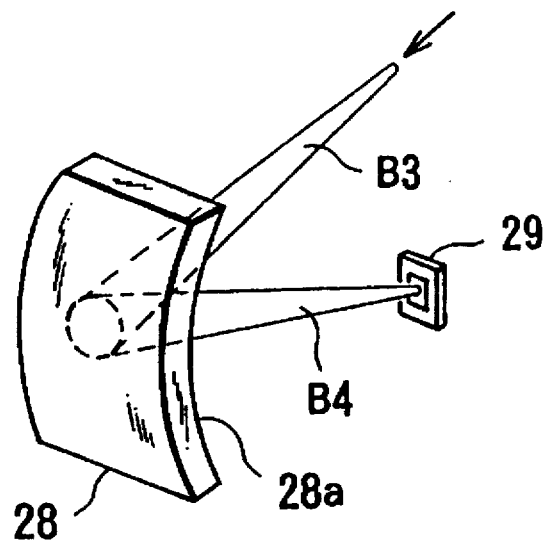
FIG. 2 is a perspective view showing a curved mirror.

FIG. 2 is a perspective view showing the curved mirror 28. As may be understood from FIGS. 1 and 2, the reflecting surface 28a of the curved mirror 28 is a cylindrical surface so that the light beam B4 reflected from reflecting surface 28a is converged and focused onto the light detecting surface of the photoreceptor element 29.

An operation of the first embodiment is described below.

The light beam B1 emitted by the light source 23 passes through the correcting cylinder lens 26, and is deflected by one of the rotating reflecting surfaces of the polygon mirror 22. The deflected light beam B1 enters the fΘ lenses 24 and 25 and is transmitted to the curved mirror 28 as light beam B3. The curved mirror 28 reflects and converges light beam B3 onto the photoreceptor element 29 as light beam B4. When the photoreceptor element 29 detects the presence of light beam B4, a horizontal synchronizing signal is outputted by the light beam sensing circuit board 30, and is inputted into the control unit 31, which controls the light source 23. When a predetermined time has passed from the moment that the horizontal synchronizing signal is inputted, the light source 23 is actuated, so that the scanning light beam B3 starts to form a latent image on the photosensitive drum D.

As described above, the photoreceptor element 29 and curved mirror 28 are provided at the beginning of the scanning sweep of scanning light beam B3. In other words, the photoreceptor element 29 and the curved mirror 28 are positioned ahead of the area R in which the light beam B3 scans to form a latent image on the photosensitive drum D. The photoreceptor element 29 is located opposite from curved mirror 28 with respect to the area R. Therefore, according to this embodiment, even if the photoreceptor element 29 and the light beam sensing circuit board 30 are provided close to the curved mirror 28, they do not interfere with the light beam B3, and the degree of freedom in arranging the photoreceptor element 29 and the light beam sensing circuit board 30 is increased. Accordingly, the light beam scanning device can be easily miniaturized.

Further, according to this embodiment, the light beam B4 is reflected and converged onto the light receiving surface of the photoreceptor element 29 by the curved mirror 28, which is the sole optical component effecting this. A correcting cylinder lens is not necessary nor need not be provided between the curved mirror 28 and the photoreceptor element 29. Therefore, in comparison with a conventional device, the number of components is reduced, and thus the structure is simplified, reducing manufacturing cost.

Figure 3:
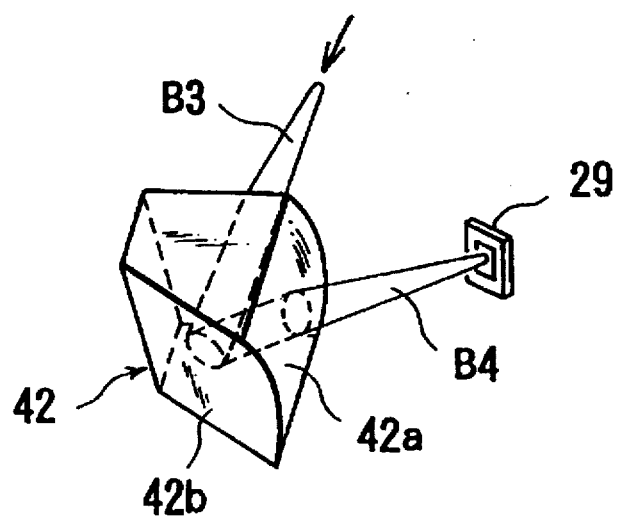
FIG. 3 is a perspective view showing an example of a prism transmitting a light beam onto a photoreceptor element.

FIG. 3 shows a prism 42 which is an example of an optical component which can be used in place of the curved mirror 28 (FIG. 1). The prism 42 has a convex exterior focusing surface 42a curved in a cylindrical shape and an internal reflecting surface 42b. The light beam B3 enters prism 42, is reflected internally by the internal reflecting surface 42b, is focused by the focusing surface 42a, and is transmitted and converged as light beam B4 onto the photoreceptor element 29 (FIG. 1).

The prism 42 is made of plastic and can focus light beam B4 onto the photosensitive element 29 without any other optical component, such as a correcting cylinder lens. Therefore, by using prism 42, an effect similar to the construction using the curved mirror 28 is obtained.

Note that the photoreceptor element 29 is not necessarily positioned between the curved mirror 28 and the light source 23 as shown in FIG. 1, may be provided at a location between the outlet opening 27 and the curved mirror 28.

Although the optical components 28 and 42 converge the light beam in the auxiliary scanning direction in the above embodiment, these components may converge the light beam in the main scanning direction also.

Although the embodiments of the present invention have been described herein with reference to the accompanying drawings, obviously many modifications and changes may be made by those skilled in the art without departing from the scope of the invention.

I claim:

1. A write start position detecting device provided in a light beam scanning device which scans, in a main scanning direction, a light beam emitted from a light source, to form a latent image on a photosensitive member, said device comprising:

a photoreceptor element that detects said light beam; and a single optical component that converges the light beam in a single direction and reflects the light beam onto said photoreceptor element, said single optical component being located at a position such that the light beam reflected from said single optical component illuminates said photoreceptor element prior to the light source starting to form the latent image on the photosensitive member.

2. The write start position detecting device according to claim 1, said photoreceptor element being located at a position, with respect to said single optical component, ahead of the photosensitive member, with respect to a direction in which the light beam scans the photosensitive member to form the latent image thereon.

3. The write start position detecting device according to claim 1, the single optical component converges said light beam in an auxiliary scanning direction perpendicular to the main scanning direction.

4. The write start position detecting device according to claim 1, the single optical component converges said light beam in the main scanning direction.

5. The write start position detecting device according to claim 1, said single optical component comprising a mirror having a curved reflecting surface.

6. The write start position detecting device according to claim 1, said single optical component comprising a prism having a curved exterior transmissive surface.

7. The write start position detecting device according to claim 1, said single optical component positioned to reflect and converge a light beam passing through an FΘ lens unit.

8. The write start position detecting device according to claim 1, said single optical component reflecting and converging light not incident onto the photosensitive member.

9. The write start position detecting device according to claim 1, said single optical component being positioned between an area in which the light beam scans to form a latent image on the photosensitive member and said photoreceptor element.

10. A write start position detecting device provided in a light beam scanning device which scans, in a main scanning direction, a light beam emitted from a light source, to form a latent image on a photosensitive member, said device comprising:

means for detecting the light beam; and means for reflecting and converging the light beam on said detecting means, said reflecting and converging means being located at a position such that the light beam reflected therefrom illuminates said detecting means prior to the light source starting to form a latent image on the photosensitive member, said reflecting and converging means converging the light beam in one direction.

11. The write start position detecting device according to claim 7, said reflecting and converging means positioned to reflect and converge a light beam passing through an FΘ lens unit.

12. The write start position detecting device according to claim 10, said reflecting and converging means reflecting and converging light not incident onto the photosensitive member.

13. The write start position detecting device according to claim 10, said reflecting and converging means being positioned between an area in which the light beam scans to form a latent image on the photosensitive member and said means for detecting the light beam.

14. The write start position detecting device according to claim 10, said reflecting and converging means comprising a single optical component.

15. A write start position detecting device provided in a light beam scanning device which scans, in a main scanning direction, a light beam emitted from a light source, to form a latent image on a photosensitive member, said device comprising:

a single optical component located ahead of a position where the light beam starts to scan the photosensitive member; and a photoreceptor element that detects the light beam focused by said single optical component, said photoreceptor element being located at a position opposite to said single optical component with respect to an area in which the light beam scans incident on the photosensitive member.

16. The write start position detecting device according to claim 15, said single optical component positioned to reflect and converge a light beam passing through an FΘ lens unit.

17. The write start position detecting device according to claim 15, said single optical component reflecting and converging light not incident onto the photosensitive member.

18. The write start position detecting device according to claim 15, said single optical component being positioned between an area in which the light beam scans to form a latent image on the photosensitive member and said photoreceptor element.

19. The write start position detecting device according to claim 15, said single optical component comprising a mirror having a curved reflecting surface.

20. The write start position detecting device according to claim 15, said single optical component comprising a prism having a curved exterior transmissive surface.

21. The write start position detecting device according to claim 15, said single optical component converging the light beam in an auxiliary scanning direction perpendicular to the main scanning direction.

* * * * *